(12) United States Patent
Goto et al.

(10) Patent No.: US 10,336,024 B2
(45) Date of Patent: Jul. 2, 2019

(54) POLYVINYL ALCOHOL BASED POLARIZING FILM CONTAINING IODINE AND BORIC ACID

(71) Applicant: NITTO DENKO CORPORATION, Ibaraki-shi, Osaka (JP)

(72) Inventors: Shusaku Goto, Ibaraki (JP); Yoshifumi Yamamoto, Ibaraki (JP); Kentaro Ikeshima, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/513,380

(22) Filed: Oct. 14, 2014

(65) Prior Publication Data
US 2015/0131151 A1 May 14, 2015

(30) Foreign Application Priority Data

Nov. 14, 2013 (JP) .................................. 2013-235547

(51) Int. Cl.
| | | |
|---|---|---|
| *B29D 11/00* | (2006.01) | |
| *G02B 1/04* | (2006.01) | |
| *G02B 5/30* | (2006.01) | |
| *B29K 29/00* | (2006.01) | |

(52) U.S. Cl.
CPC .. *B29D 11/00788* (2013.01); *B29D 11/00644* (2013.01); *G02B 1/04* (2013.01); *G02B 5/3033* (2013.01); *B29K 2029/04* (2013.01)

(58) Field of Classification Search
CPC . G02B 5/305; G02B 1/04; G02C 7/12; B29D 11/00644; B29D 11/0073

USPC ....................................... 359/483.01–494.01
See application file for complete search history.

(56) References Cited

U.S. PATENT DOCUMENTS

| | | | |
|---|---|---|---|
| 4,181,756 | A | 1/1980 | Fergason |
| 4,396,646 | A | 8/1983 | Schuler et al. |
| 4,466,704 | A | 8/1984 | Schuler et al. |
| 7,582,857 | B2 | 9/2009 | Gruev et al. |

(Continued)

FOREIGN PATENT DOCUMENTS

| | | |
|---|---|---|
| CN | 101104329 A | 1/2008 |
| CN | 101137917 A | 3/2008 |

(Continued)

OTHER PUBLICATIONS

Office Action dated Feb. 5, 2016, issued in counterpart Korean Patent Application No. 10-2014-0152691, with English translation. (15 pages).

(Continued)

*Primary Examiner* — Nicholas R. Pasko
(74) *Attorney, Agent, or Firm* — Westerman, Hattori, Daniels & Adrian, LLP

(57) ABSTRACT

There is provided a polarizing film that is excellent in optical characteristics, and is excellent in durability and water resistance. A polarizing film according to an embodiment of the present invention includes a polyvinyl alcohol-based resin film having a thickness of 10 μm or less. The polyvinyl alcohol-based resin film has an iodine concentration of 6.0 wt % or less; and the polarizing film has a cross-linking index defined by the below-indicated equation of from 100 to 200: (Cross-linking index)=(Iodine concentration in film)×(Boric acid concentration in film).

3 Claims, 1 Drawing Sheet

THE LARGER VALUE OF a AND b IS DEFINED AS A DECOLORIZATION AMOUNT

(56) References Cited

U.S. PATENT DOCUMENTS

| | | |
|---|---|---|
| 7,667,801 B2 | 2/2010 | Fukagawa et al. |
| 7,767,047 B2 | 8/2010 | Fujita et al. |
| 7,929,086 B2 | 4/2011 | Toyama et al. |
| 8,031,296 B2 | 10/2011 | Maezawa et al. |
| 8,314,987 B2 | 11/2012 | Goto et al. |
| 8,320,042 B2 | 11/2012 | Goto et al. |
| 8,379,169 B2 | 2/2013 | Kitagawa et al. |
| 8,411,360 B2 | 4/2013 | Kitagawa et al. |
| 8,467,177 B2 | 6/2013 | Mathew et al. |
| 8,520,169 B2 | 8/2013 | Kitagawa et al. |
| 8,520,171 B2 | 8/2013 | Kitagawa et al. |
| 8,699,135 B2 | 4/2014 | Goto et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 8,852,374 B2 | 10/2014 | Goto et al. |
| 8,917,376 B2 | 12/2014 | Yoshimi |
| 9,023,168 B2 | 5/2015 | Kitagawa et al. |
| 9,039,860 B2 | 5/2015 | Kunai |
| 9,069,137 B2 | 6/2015 | Bae et al. |
| 9,158,051 B2 | 10/2015 | Nam et al. |
| 9,177,983 B2 | 11/2015 | Kuang et al. |
| 9,227,222 B2 | 1/2016 | Izaki et al. |
| 9,283,740 B2 | 3/2016 | Kitagawa et al. |
| 9,291,744 B2 | 3/2016 | Sawada et al. |
| 9,329,307 B2 | 5/2016 | Sawada et al. |
| 9,411,081 B2 | 8/2016 | Shimizu et al. |
| 2004/0212555 A1 | 10/2004 | Falco |
| 2005/0285286 A1* | 12/2005 | Shuto ............... C08K 3/16 264/1.34 |
| 2007/0035681 A1* | 2/2007 | Okada ............... G02F 1/133528 349/97 |
| 2008/0011411 A1 | 1/2008 | Fujita et al. |
| 2008/0192345 A1 | 8/2008 | Mochizuki et al. |
| 2009/0251650 A1 | 10/2009 | Fukagawa et al. |
| 2009/0279030 A1 | 11/2009 | Toyama et al. |
| 2009/0323185 A1 | 12/2009 | Goto et al. |
| 2010/0002171 A1 | 1/2010 | Yoshimi |
| 2010/0085641 A1* | 4/2010 | Saiki ............... G02B 5/3033 359/487.01 |
| 2010/0182546 A1 | 7/2010 | Maezawa et al. |
| 2010/0206478 A1 | 8/2010 | Fujita et al. |
| 2010/0245727 A1* | 9/2010 | Shigetomi ............... B29C 55/04 349/96 |
| 2011/0128412 A1 | 6/2011 | Milnes et al. |
| 2011/0148839 A1 | 6/2011 | Hwang et al. |
| 2011/0163281 A1* | 7/2011 | Bae ............... B29D 11/00644 252/585 |
| 2012/0052197 A1 | 3/2012 | Sawada et al. |
| 2012/0055607 A1* | 3/2012 | Kitagawa ............... B32B 41/00 156/64 |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0106063 A1 | 5/2012 | Mathew et al. |
| 2012/0206641 A1 | 8/2012 | Baba |
| 2012/0243089 A1* | 9/2012 | Araki ............... B29C 39/18 359/487.01 |
| 2012/0281279 A1 | 11/2012 | Goto et al. |
| 2012/0320318 A1 | 12/2012 | Sato et al. |
| 2012/0327512 A1 | 12/2012 | Goto et al. |
| 2013/0100529 A1 | 4/2013 | Kitagawa et al. |
| 2013/0114137 A1* | 5/2013 | Bae ............... G02B 5/3083 359/483.01 |
| 2013/0114139 A1 | 5/2013 | Kitagawa et al. |
| 2013/0128357 A1 | 5/2013 | Izaki et al. |
| 2013/0141787 A1* | 6/2013 | Kim ............... G02B 5/3033 359/487.02 |
| 2013/0229602 A1 | 9/2013 | Yoshimi |
| 2013/0249129 A1 | 9/2013 | Shimizu et al. |
| 2013/0265708 A1 | 10/2013 | Mathew et al. |
| 2014/0016198 A1 | 1/2014 | Sawada et al. |
| 2014/0044947 A1 | 2/2014 | Sawada et al. |
| 2014/0186568 A1 | 7/2014 | Kitagawa et al. |
| 2015/0131151 A1 | 5/2015 | Goto et al. |
| 2015/0132561 A1* | 5/2015 | Goto ............... G02B 5/3033 428/220 |
| 2015/0183199 A1 | 7/2015 | Kitagawa et al. |
| 2015/0192720 A1* | 7/2015 | Goto ............... G02B 5/3033 428/220 |
| 2015/0219797 A1 | 8/2015 | Goto et al. |
| 2016/0025910 A1 | 1/2016 | Sawada et al. |
| 2016/0047960 A1 | 2/2016 | Izaki et al. |
| 2016/0054494 A1 | 2/2016 | Kitagawa et al. |
| 2016/0103258 A1 | 4/2016 | Kitagawa et al. |
| 2016/0195653 A1 | 7/2016 | Lee et al. |
| 2016/0299271 A1 | 10/2016 | Lee et al. |
| 2016/0299272 A1 | 10/2016 | Lee et al. |
| 2016/0313480 A1 | 10/2016 | Lee et al. |
| 2016/0377777 A1 | 12/2016 | Lee et al. |
| 2017/0003426 A1 | 1/2017 | Kunai |
| 2017/0131448 A1 | 5/2017 | Lee et al. |

FOREIGN PATENT DOCUMENTS

| | | |
|---|---|---|
| CN | 101258028 A | 9/2008 |
| CN | 102859402 A | 1/2013 |
| CN | 103080790 A | 5/2013 |
| CN | 103080792 A | 5/2013 |
| CN | 103091760 A | 5/2013 |
| CN | 103135160 A | 6/2013 |
| CN | 103238089 A | 8/2013 |
| CN | 103389535 A | 11/2013 |
| JP | 60-36563 B2 | 8/1985 |
| JP | H06-289224 A | 10/1994 |
| JP | 2000-338329 A | 12/2000 |
| JP | 2001-174638 A | 6/2001 |
| JP | 2002-258051 A | 9/2002 |
| JP | 2002-333523 A | 11/2002 |
| JP | 2005-181818 A | 7/2005 |
| JP | 2007-86748 A | 4/2007 |
| JP | 2007-241314 A | 9/2007 |
| JP | 2007-298958 A | 11/2007 |
| JP | 2008-90216 A | 4/2008 |
| JP | 2008-102246 A | 5/2008 |
| JP | 4339350 B2 | 10/2009 |
| JP | 2011-81315 A | 4/2011 |
| JP | 4691205 B1 | 6/2011 |
| JP | 4751481 B1 | 8/2011 |
| JP | 4838283 B2 | 12/2011 |
| JP | 2012-73582 A | 4/2012 |
| JP | 2012-78780 A | 4/2012 |
| JP | 2012-137738 A | 7/2012 |
| JP | 2013-11837 A | 1/2013 |
| JP | 2013-97113 A | 5/2013 |
| JP | 2013-105036 A | 5/2013 |
| JP | 2013-174786 A | 9/2013 |
| JP | 2013-182162 A | 9/2013 |
| JP | 2013-238640 A | 11/2013 |
| JP | 2014-006505 A | 1/2014 |
| JP | 2014-81482 A | 5/2014 |
| JP | 2014-167547 A | 9/2014 |
| JP | 2014-211548 A | 11/2014 |
| JP | 5667016 B2 | 12/2014 |
| JP | 2016-525725 A | 8/2016 |
| JP | 2016-539371 A | 12/2016 |
| JP | 2017-503193 A | 1/2017 |
| KR | 10-0950855 A | 3/2010 |
| KR | 10-2010-0087837 A | 8/2010 |
| KR | 10-2010-0125558 A | 12/2010 |
| KR | 10-2011-0110889 A | 10/2011 |
| KR | 10-2012-0123498 A | 11/2012 |
| KR | 10-2013-00050127 A | 5/2013 |
| KR | 10-2013-0080869 A | 7/2013 |

(56) References Cited

FOREIGN PATENT DOCUMENTS

| | | |
|---|---|---|
| KR | 10-2013-0108276 A | 10/2013 |
| KR | 10-2015-0111871 A | 10/2015 |
| TW | 201217148 A | 5/2012 |
| TW | 201231275 A | 8/2012 |
| TW | 201343370 A | 11/2013 |
| WO | 2005/029143 A1 | 3/2005 |
| WO | 2012074063 A1 | 6/2012 |
| WO | 2015/108261 A1 | 7/2015 |
| WO | 2015/147553 A1 | 10/2015 |
| WO | 2016/003105 A1 | 1/2016 |

OTHER PUBLICATIONS

Extended European Search Report dated Apr. 13, 2015, issued in corresponding European Patent Application No. 14189373.5 (4 pages).

Office Action dated Jul. 22, 2015, issued in counterpart Japanese Patent Application No. 2013-235547, with English translation (5 pages).

Explanation of Circumstances Concerning Accelerated Examination dated Jan. 14, 2015, issued in corresponding Japanese Patent Application No. 2013-235547, English translation (7 pages).

Office Action dated Jun. 12, 2016, issued in counterpart Chinese Patent Application No. 2014106381740, with English translation. (13 pages).

Office Action dated Jun. 27, 2016, issued in counterpart Taiwanese Application No. 103136127, with English translation. (8 pages).

Report on Prior Art Search (for preferential examination) in Korea, dated Dec. 30, 2015, issued in Korean Patent Application No. 10-2015-0185893, with English translation. (30 pages). Counterpart to U.S. Appl. No. 15/042,599.

Office Action dated Jan. 20, 2016, issued in Korean Patent Application No. 10-2015-0185893, with English translation. (17 pages). Counterpart to U.S. Appl. No. 15/042,599.

International Search Report dated May 17, 2016, issued in International Application No. PCT/JP2016/053748. (3 pages). Counterpart to U.S. Appl. No. 15/042,599.

Office Action dated May 26, 2016, issued in Korean Application No. 10-2015-0185893, with English translation (15 pages) Counterpart to U.S. Appl. No. 15/042,599.

Office Action dated Mar. 8, 2017, issued in Japanese Patent Application No. 2015-027660, with English translation (22 pages). Counterpart to U.S. Appl. No. 15/042,599.

Notice of Allowance dated May 10, 2017 issued in Japanese application No. 2015-027660. Counterpart to U.S. Appl. No. 15/042,599.

Non-final Office Action dated Feb. 7, 2017, issued in U.S. Appl. No. 15/042,599.

Final Office Action dated Oct. 3, 2017, issued in U.S. Appl. No. 15/042,599.

Explanation of Circumstances Concerning Accelerated Examination dated Jan. 14, 2015, issued in Japanese Patent Application No. 2013-235546, with translation.(Corresponding to U.S. Appl. No. 14/488,738).

Extended European Search Report dated Apr. 13, 2015, issued in Application No. 14189371.9(Corresponding to U.S. Appl. No. 14/488,738).

Office Action dated Dec. 1, 2016, issued in Chinese Patent Application No. 201410638410.9, with translation. (Corresponding to U.S. Appl. No. 14/488,738).

Office Action dated Jul. 4, 2016, issued in Chinese Patent Application No. 201410638410.9, with translation. (Corresponding to U.S. Appl. No. 14/488,738).

Office Action dated Feb. 25, 2015, issued in Japanese Patent Application No. 2013-235546, with translation. (Corresponding to U.S. Appl. No. 14/488,738).

Office Action dated Jul. 22, 2015, issued in Japanese Patent Application No. 2013-235546, with translation. (Corresponding to U.S. Appl. No. 14/488,738).

Office Action dated Feb. 5, 2016, issued in Korean Patent Application No. 10-2014-0152690, with translation. (Corresponding to U.S. Appl. No. 14/488,738).

Office Action dated Nov. 25, 2015, issued in Taiwanese Patent Application No. 103132278, with translation. (Corresponding to U.S. Appl. No. 14/488,738).

Non-Final Office Action dated Apr. 3, 2015, issued in U.S. Appl. No. 14/488,738.

Final Office Action dated Oct. 8, 2015, issued in U.S. Appl. No. 14/888,738.

Non-Final Office Action dated Oct. 4, 2016, issued in U.S. Appl. No. 14/488,738.

Final Office Action dated Apr. 28, ,2017, issued in U.S. Appl. No. 14/488,738.

Non-Final Office Action dated Jul. 21, 2017, issued in U.S. Appl. No. 14/662,843.

Final Office Action dated Dec. 6, 2017, issued in U.S. Appl. No. 14/662,843.

Notice of Allowance dated Feb. 5, 2018, issued in U.S. Appl. No. 15/042,599.

Office Action dated Feb. 25, 2015, issued in corresponding Japanese Patent Application No. 2013-235547, w/ Partial English translation. (9 pages).

\* cited by examiner

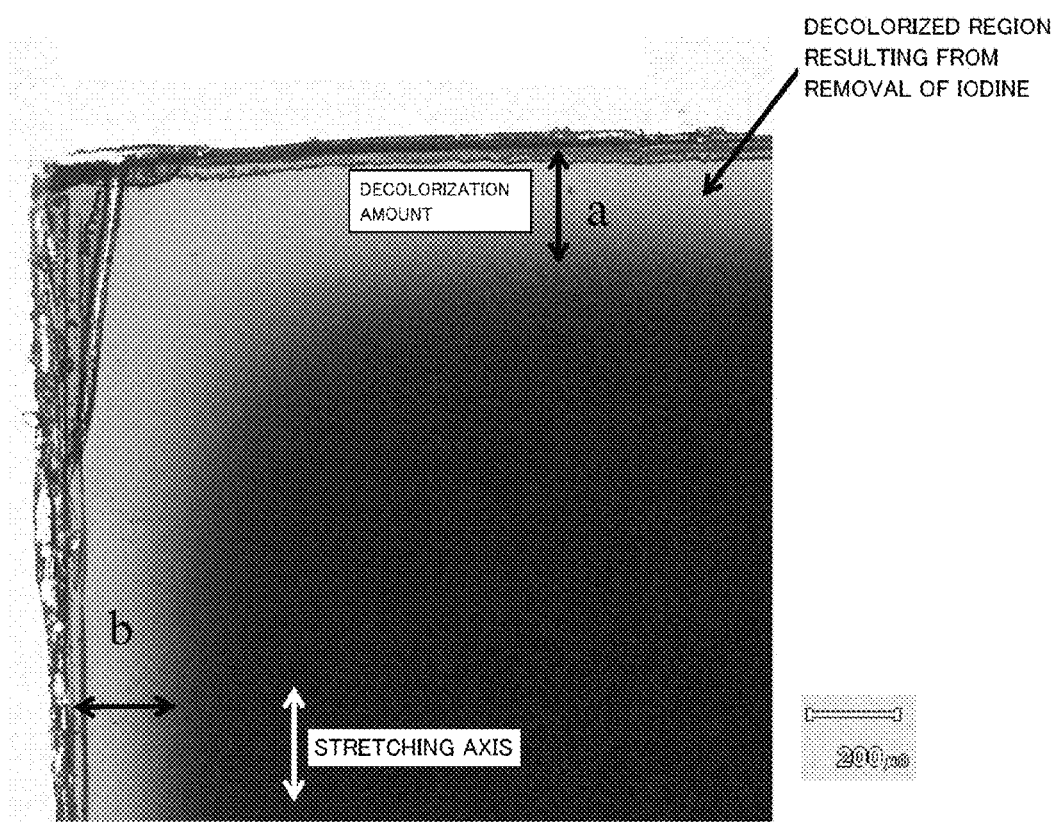

POLYVINYL ALCOHOL BASED POLARIZING FILM CONTAINING IODINE AND BORIC ACID

This application claims priority under 35 U.S.C. Section 119 to Japanese Patent Application No. 2013-235547 filed on Nov. 14, 2013, which is herein incorporated by reference.

BACKGROUND OF THE INVENTION

1. Field of the Invention

The present invention relates to a polarizing film and a method for manufacturing a polarizing film.

2. Description of the Related Art

Polarizing films are placed on both sides of a liquid crystal cell of a liquid crystal display apparatus as a typical image display apparatus, the placement being attributable to an image-forming mode of the apparatus. For example, the following method has been proposed as a method of manufacturing the polarizing film (for example, Japanese Patent Application Laid-open No. 2000-338329). A laminate having a resin substrate and a polyvinyl alcohol (PVA)-based resin layer is stretched, and is then subjected to dyeing treatment so that the polarizing film may be formed on the resin substrate. According to such method, a polarizing film having a small thickness is obtained. Accordingly, the method has been attracting attention because of its potential to contribute to thinning of an image display apparatus in recent years. However, enhancement of optical characteristics (such as polarization degree) of the thin polarizing film obtained by such method involves a problem of durability in that a crack is liable to be generated at the time of heating.

SUMMARY OF THE INVENTION

According to an embodiment of the present invention, there is provided a polarizing film that is excellent in optical characteristics, and is excellent in durability and water resistance.

A polarizing film according to an embodiment of the present invention includes a polyvinyl alcohol-based resin film having a thickness of 10 μm or less. The polyvinyl alcohol-based resin film has an iodine concentration of 6.0 wt % or less; and the polarizing film has a cross-linking index defined by the below-indicated equation of from 100 to 200.

(Cross-linking index)=(Iodine concentration in film)×(Boric acid concentration in film)

According to another aspect of the present invention, there is provided a method for manufacturing the polarizing film as described above. The method includes: forming a polyvinyl alcohol-based resin layer on one side of a resin substrate; and stretching and dyeing a laminate of the resin substrate and the polyvinyl alcohol-based resin layer to form the polyvinyl alcohol-based resin layer into a polarizing film. The stretching includes stretching the laminate while immersing the laminate in an aqueous solution of boric acid, the aqueous solution of boric acid having a boric acid concentration of 5.0 wt % or more.

In one embodiment of the present invention, the aqueous solution of boric acid has a temperature of 60° C. or more.

BRIEF DESCRIPTION OF THE DRAWINGS

FIG. 1 is a schematic view for explaining the calculation of a decolorization amount.

DETAILED DESCRIPTION OF THE PREFERRED EMBODIMENTS

Hereinafter, embodiments of the present invention are described. However, the present invention is not limited to these embodiments.

A. Polarizing Film

A polarizing film of the present invention includes a polyvinyl alcohol-based resin (hereinafter referred to as "PVA-based resin") film containing iodine.

Any appropriate resin can be adopted as the PVA-based resin for forming the PVA-based resin film. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

As described above, the polarizing film contains iodine. The polarizing film is substantially a PVA-based resin film onto which iodine is adsorbed in an aligned state. The iodine concentration in the PVA-based resin film is 6.0 wt % or less, preferably from 4.0 wt % to 5.8 wt %, more preferably from 4.8 wt % to 5.5 wt %. According to the present invention, through the optimization of a cross-linking index, the durability and water resistance of a thin polarizing film having such low iodine content can be improved, and in particular, the water resistance can be significantly improved. More specifically, in order to obtain excellent optical characteristics (such as single axis transmittance) in a thin polarizing film (for example, having a thickness of 10 μm or less), an extremely low iodine concentration in the PVA-based resin film (polarizing film) is required. Iodine has a cross-linking effect on PVA, and hence a reduction in iodine concentration reduces the degree of cross-linking of PVA. As a result, the water resistance becomes insufficient. According to the present invention, through the optimization of the cross-linking index, the degree of cross-linking of PVA can be controlled within an appropriate range even at a low iodine concentration. Accordingly, excellent optical characteristics (such as single axis transmittance) and excellent durability and water resistance can both be achieved in the thin polarizing film. It should be noted that the term "iodine concentration" as used herein means the amount of all iodine contained in the polarizing film (PVA-based resin film). More specifically, in the polarizing film, iodine is present in the forms of, for example, $I^-$, $I_2$, and $I_3^-$, and the term "iodine concentration" as used herein means the concentration of iodine encompassing all such forms. As described later, the iodine concentration may be calculated on the basis of a fluorescent X-ray intensity based on fluorescent X-ray analysis and the thickness of the film (polarizing film).

In the present invention, the cross-linking index of the PVA-based resin film (polarizing film) is from 100 to 200, preferably from 100 to 130, more preferably from 100 to 110. When the cross-linking index falls within such range, as described above, excellent optical characteristics (such as single axis transmittance) and excellent durability and water resistance can both be achieved in the thin polarizing film. When the cross-linking index is less than 100, the water resistance of the polarizing film is insufficient in many cases. When the cross-linking index is more than 200, a crack is liable to be generated, and durability at the time of heating is insufficient in many cases. When the cross-linking index is optimized so as to fall within such range, the below-indicated advantage can be obtained. In a thin polarizing film (for example, having a thickness of 10 μm or less), a change in iodine concentration in the film depending on the optical characteristics is extremely large as compared to a thick polarizer (for example, having a thickness of 20 μm or more). Iodine has a promoting effect on cross-linking with boric acid, and hence, in the thin polarizing film, a change in designed single axis transmittance also changes the degree of cross-linking with boric acid, with the result that the optical characteristics may deviate from the designed ones (Such problem hardly occurs in the thick polarizer). More specifically, when the iodine concentration is reduced in order to set the single axis transmittance higher, the degree of cross-linking with boric acid also reduces. As a result, the water resistance of the polarizing film becomes insufficient. To solve such problem, through the optimization of the cross-linking index, a desired boric acid concentration at a predetermined iodine concentration can be obtained. In other words, a desired boric acid concentration can be determined in accordance with the designed single axis transmittance (to be described later). As a result, the degree of cross-linking with boric acid can be controlled within an appropriate range in accordance with a predetermined single axis transmittance (iodine concentration). Ultimately, there can be obtained a polarizing film that is excellent in optical characteristics, and is excellent in durability and water resistance (in particular, water resistance). That is, through the optimization of the cross-linking index, the problem peculiar to the thin polarizing film can be solved. Such problem has been recognized only after actual production of the thin polarizing film with its optical characteristics changed over a wide range, and the fact that the problem has been solved is an industrially extremely excellent effect.

The cross-linking index is determined by the following equation.

(Cross-linking index)=(Iodine concentration in film)×(Boric acid concentration in film)

The iodine concentration (wt %) in the film may be calculated by the below-indicated equation on the basis of a fluorescent X-ray intensity (kcps) based on fluorescent X-ray analysis and the thickness (μm) of the film.

(Iodine concentration)=18.2×(Fluorescent X-ray intensity)/(Thickness of film)

In the equation, the constant "18.2" may be obtained by measuring the fluorescent X-ray intensities of samples whose thicknesses, iodine concentrations, and potassium concentrations are known (such as PVA-based resin films having added thereto given amounts of KI) to prepare a calibration curve. In addition, the boric acid concentration (wt %) in the film may be determined through the use of a boric acid amount index calculated on the basis of attenuated total reflection spectroscopy (ATR) measurement.

(Boric acid amount index)=(Intensity of boric acid peak at 665 $cm^{-1}$)/(Intensity of reference peak at 2941 $cm^{-1}$)

(Boric acid concentration)=(Boric acid amount index)×5.54+4.1

In the equation, each of "5.54" and "4.1" is a constant obtained from a calibration curve prepared from known samples in the same manner as above.

The boric acid concentration in the PVA-based resin film is preferably from 17 wt % to 30 wt %, more preferably from 18 wt % to 25 wt %, still more preferably from 19 wt % to 22 wt %. According to the present invention, through the optimization of the cross-linking index as described above, a preferred boric acid concentration at a predetermined iodine concentration can be determined.

The thickness of the PVA-based resin film (polarizing film) is 10 μm or less, preferably 7 μm or less, more preferably 6 μm or less. In the PVA-based resin film having such thickness, the securement of predetermined optical characteristics (such as single axis transmittance) requires an extremely low iodine concentration, and hence the effect achieved through the optimization of the cross-linking index is significant. Meanwhile, the thickness of the PVA-based resin film is preferably 1.0 μm or more, more preferably 2.0 μm or more.

The polarizing film preferably exhibits absorption dichroism at any one of the wavelengths of from 380 nm to 780 nm. The single axis transmittance of the polarizing film is preferably from 43.0% to 45.0%, more preferably from 44.0% to 45.0%. When the single axis transmittance is increased, the brightness of an image display apparatus can be improved. Further, the quantity of light for achieving equal brightness reduces, and hence power consumption can be reduced or the life of a battery in mobile use can be increased. The polarization degree of the polarizing film is preferably from 90% to 99.99%, more preferably from 95% to 99.99%. As described above, through the optimization of the cross-linking index, such high single axis transmittance and excellent durability and water resistance can both be achieved.

B. Method for Manufacturing Polarizing Film

A method for manufacturing a polarizing film according to one embodiment of the present invention typically includes: forming a PVA-based resin layer on one side of a resin substrate; and stretching and dyeing a laminate of the resin substrate and the PVA-based resin layer to form the polyvinyl alcohol-based resin layer into a polarizing film.

B-1. Formation of PVA-Based Resin Layer

Any appropriate method may be adopted as a method of forming the PVA-based resin layer. The PVA-based resin layer is preferably formed by applying an application liquid containing a PVA-based resin onto the resin substrate and drying the liquid.

As a formation material for the resin substrate, any appropriate thermoplastic resin may be adopted. Examples of the thermoplastic resin include: an ester-based resin such as a polyethylene terephthalate-based resin; a cycloolefin-based resin such as a norbornene-based resin; an olefin-based resin such as polypropylene; a polyimide-based resin; a polycarbonate-based resin; and a copolymer resin thereof. Of those, a norbornene-based resin and an amorphous polyethylene terephthalate-based resin are preferred.

In one embodiment, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephtalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and favorable performance of the underwater stretching. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.). In another embodiment, a glass transition temperature of less than 60° C. is permitted as long as the resin substrate does not deform during the application and drying of the application liquid containing the PVA-based resin. It should be noted that the glass transition temperature of the resin substrate can be adjusted by, for example, introducing a modification group into the formation material or heating the substrate constituted of a crystallization material. The glass transition temperature (Tg) is a value determined in conformity with JIS K 7121.

The thickness of the resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, underwater stretching, it may take a long time for the resin substrate to absorb water, and an excessively large load may be needed in the stretching.

The application liquid is typically a solution prepared by dissolving the PVA-based resin in a solvent. Examples of the solvent include water, dimethylsulfoxide, dimethylformamide, dimethylacetamide, N-methylpvrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained. A further example of the additive is an easy-adhesion component. The use of the easy-adhesion component can improve adhesiveness between the resin substrate and the PVA-based resin layer. As a result, an inconvenience such as peeling of the PVA-based resin layer from the substrate is suppressed, and dyeing and underwater stretching to be described later can be favorably performed. Modified PVA such as acetoacetyl-modified PVA is used as the easy-adhesion component.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The resin substrate may be subjected to a surface treatment (such as a corona treatment) before the formation of the PVA-based resin layer. Alternatively, an easy-adhesion layer may be formed on the resin substrate. Such treatment can improve adhesiveness between the resin substrate and the PVA-based resin layer.

The thickness of the PVA-based resin layer before the stretching is preferably 3 μm to 20 μm.

B-2. Stretching

Any appropriate method may be adopted as a method of stretching the laminate. Specifically, fixed-end stretching may be adopted or free-end stretching (such as a method involving passing the laminate through rolls having different peripheral speeds to uniaxially stretch the laminate) may be adopted. Of those, free-end stretching is preferred.

The stretching direction of the laminate may be appropriately set. In one embodiment, the laminate having a long shape is stretched in its lengthwise direction. In this case, there may be typically adopted a method involving passing the laminate between rolls having different peripheral speeds to stretch the laminate. In another embodiment, the laminate having a long shape is stretched in its widthwise direction. In this case, there may be typically adopted a method involving stretching the laminate using a tenter stretching apparatus.

A stretching mode is not particularly limited and may be an in-air stretching mode or an underwater stretching mode.

Of those, an underwater stretching mode is preferred. According to the underwater stretching mode, the stretching can be performed at a temperature lower than the glass transition temperature (typically about 80° C.) of each of the resin substrate and the PVA-based resin layer, and hence the PVA-based resin layer can be stretched at a high ratio while its crystallization is suppressed. As a result, a polarizing film having excellent optical characteristics can be produced.

The stretching of the laminate may be performed in one stage, or may be performed in a plurality of stages. When the stretching is performed in a plurality of stages, for example, the free-end stretching and the fix-end stretching may be performed in combination, or the underwater stretching mode and the in-air stretching mode may be performed in combination. When the stretching is performed in a plurality of stages, the stretching ratio (maximum stretching ratio) of the laminate to be described later is the product of stretching ratios in the respective stages.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 60° C. or more, preferably 65° C. to 85° C., more preferably 65° C. to 75° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 60° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained. The laminate is preferably immersed in the stretching bath for a time of 15 seconds to 5 minutes.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water serving as a solvent. In the present invention, the boric acid concentration is 5.0 wt % or more, preferably from 5.0 wt % to 7.5 wt %, more preferably from 5.0 wt % to 6.5 wt %. According to the present invention, through the optimization of the cross-linking index, the boric acid concentration can be set within such desired range. As a result, the degree of cross-linking with boric acid can be controlled within an appropriate range. As described above, in the thin polarizing film, a change in designed single axis transmittance also changes the degree of cross-linking with boric acid, with the result that the optical characteristics may deviate from the designed ones. According to the present invention, as described above, through the optimization of the cross-linking index, a desired boric acid concentration at a predetermined iodine concentration can be obtained. In other words, a desired boric acid concentration can be determined in accordance with the designed single axis transmittance, and hence the boric acid concentration in underwater stretching can be determined in accordance with the desired boric acid concentration. As a result, the degree of cross-linking with boric acid can be controlled within an appropriate range in accordance with a predetermined single axis transmittance (iodine concentration), and a thin polarizing film whose optical characteristics do not vary can be obtained. Moreover, the polarizing film to be thus obtained can achieve both excellent optical characteristics and excellent durability and water resistance. It should be noted that an aqueous solution obtained by dissolving a boron compound such as borax, glyoxal, glutaric aldehyde, or the like other than boric acid or the borate in the solvent may also be used.

When the PVA-based resin layer has been caused to adsorb a dichromatic substance (typically iodine) in advance by dyeing to be described later, the stretching bath (aqueous solution of boric acid) is preferably compounded with an iodide. Compounding the bath with the iodide can suppress the elution of iodine that the PVA-based resin layer has been caused to adsorb. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The concentration of the iodide is preferably 0.05 part by to 15 parts by more preferably 0.5 part by weight to 8 parts by weight with respect to 100 parts by weight of water.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

In one embodiment, the laminate is subjected to in-air stretching at high temperature (e.g., 95° C. or more), and then subjected to the in-boric-acid-solution stretching, and dyeing to be described later. Such in-air stretching is hereinafter referred to as "preliminary in-air stretching" because the stretching can be ranked as stretching preliminary or auxiliary to the in-boric-acid-solution stretching.

When the preliminary in-air stretching is combined with the in-boric-acid-solution stretching, the laminate can be stretched at an additionally high ratio in some cases. As a result, a polarizing film having additionally excellent optical characteristics (such as a polarization degree) can be produced. For example, when a polyethylene terephthalate-based resin is used as the resin substrate, the resin substrate can be stretched satisfactorily, while its orientation is suppressed, by a combination of the preliminary in-air stretching and the in-boric-acid-solution stretching than that in the case of the in-boric-acid-solution stretching alone. As the orientation property of the resin substrate is raised, its stretching tension increases and hence it becomes difficult to stably stretch the substrate or the resin substrate ruptures. Accordingly, the laminate can be stretched at an additionally high ratio by stretching the resin substrate while suppressing its orientation.

In addition, when the preliminary in-air stretching is combined with the in-boric-acid-solution stretching, the orientation property of the PVA-based resin is improved and hence the orientation property of the PVA-based resin can be improved even after the in-boric-acid-solution stretching. Specifically, the orientation property of the PVA-based resin is improved in advance by the preliminary in-air stretching so that the PVA-based resin may easily cross-link with boric acid during the in-boric-acid-solution stretching. Then, the stretching is performed in a state where boric acid serves as a junction, and hence the orientation property of the PVA-based resin is assumed to be high even after the in-boric-acid-solution stretching. As a result, a polarizing film having excellent optical characteristics (such as a polarization degree) can be produced.

The stretching ratio in the preliminary in-air stretching is preferably 3.5 times or less. A stretching temperature in the preliminary in-air stretching is preferably equal to or higher than the glass transition temperature of the PVA-based resin. The stretching temperature is preferably 95° C. to 150° C. It should be noted that the maximum stretching ratio when the preliminary in-air stretching and the in-boric-acid-solution stretching are combined with each other is preferably 5.0 times or more, more preferably 5.5 times or more, still more preferably 6.0 times or more with respect to the original length of the laminate.

B-3. Dyeing

The dyeing is typically performed by causing the PVA-based resin layer to adsorb iodine. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, a method involving immersing the laminate in the dyeing liquid is preferred. This is because iodine can satisfactorily adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide so that the solubility of iodine in water may be increased. Specific examples of the iodide are as described above. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. so that the dissolution of the PVA-based resin may be suppressed. When the PVA-based resin layer is immersed in the dyeing liquid, an immersion time is preferably 5 seconds to 5 minutes so that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 90% or more. In another embodiment, the immersion time is set so that the single axis transmittance of the polarizing film to be obtained may be 44.0% to 45.0%.

The dyeing treatment can be performed at any appropriate timing. When the underwater stretching is performed, the dyeing treatment is preferably performed before the underwater stretching.

B-4. Any Other Treatment

The PVA-based resin layer (the laminate) may be appropriately subjected to a treatment for forming the PVA-based resin layer into a polarizing film in addition to the stretching and dyeing. Examples of the treatment for forming the PVA-based resin layer into the polarizing film include an insolubilizing treatment, a cross-linking treatment, a washing treatment, and a drying treatment. It should be noted that the number of times, order, and the like of these treatments are not particularly limited.

The insolubilizing treatment is typically performed by immersing the PVA-based resin layer (the laminate) in an aqueous solution of boric acid. Water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed before the underwater stretching treatment or the dyeing treatment.

The cross-linking treatment is typically performed by immersing the PVA-based resin layer (the laminate) in an aqueous solution of boric acid. Water resistance can be imparted to the PVA-based resin layer by subjecting the layer to the cross-linking treatment. The concentration of the aqueous solution of boric acid is preferably 1 part by weight to 5 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 60° C. The cross-linking treatment is preferably performed before the underwater stretching treatment. In a preferred embodiment, the dyeing treatment, the cross-linking treatment, and the underwater stretching treatment are performed in the stated order.

The washing treatment is typically performed by immersing the PVA-based resin layer (the laminate) in an aqueous solution of potassium iodide. The drying temperature in the drying treatment is preferably 30° C. to 100° C.

Thus, the polarizing film is formed on the resin substrate.

The polarizing film is typically used under a state in which an optically functional film is laminated on one side, or each of both sides, thereof (that is, as a polarizing plate). Any appropriate adhesive or pressure-sensitive adhesive is used in the lamination of the optically functional film. For example, the optically functional film can function as a protective film for a polarizing film, a retardation film, or the like. When the resin substrate is used, the resin substrate may be directly used as the protective film without being peeled off.

EXAMPLES

Hereinafter, the present invention is specifically described byway of Examples. However, the present invention is not limited by Examples. It should be noted that methods of measuring the respective characteristics are as described below.

1. Iodine Concentration in PVA-Based Resin Film

Polarizing films obtained in Examples and Comparative Examples were each measured for its fluorescent X-ray intensity (kcps) using a fluorescent X-ray analyzer (manufactured by Rigaku Corporation, trade name: "ZSX100E", measurement diameter: ψ10 mm). In addition, the polarizing films were each measured for its thickness (μm) using a spectral film thickness monitor (manufactured by Otsuka Electronics Co., Ltd., trade name: "MCPD-3000"). An iodine concentration (wt %) was determined using the below-indicated equation on the basis of the resultant fluorescent X-ray intensity and thickness.

(Iodine concentration)=18.2×(Fluorescent X-ray intensity)/(Thickness of film)

2. Boric Acid Concentration in PVA-Based Resin Film

The polarizing films obtained in Examples and Comparative Examples were each measured for its intensity of a boric acid peak (665 cm$^{-1}$) and intensity of a reference peak (2941 cm$^{-1}$) by attenuated total reflection spectroscopy (ATR) measurement using polarized light as measurement light with a Fourier transform infrared spectrophotometer (FT-IR) (manufactured by PerkinElmer, trade name: "SPECTRUM 2000"). A boric acid amount index was calculated by the below-indicated equation on the basis of the resultant boric acid peak intensity and reference peak intensity, and a boric acid concentration was determined by the below-indicated equation on the basis of the calculated boric acid amount index.

(Boric acid amount index)=(Intensity of boric acid peak at 665 cm$^{-1}$)/(Intensity of reference peak at 2941 cm$^{-1}$)

(Boric acid concentration)=(Boric acid amount index)×5.54+4.1

3. Crack (Durability)

A test piece having a short side in a direction perpendicular to a stretching direction (200 mm×100 mm) was cut out of each of the polarizing films obtained in Examples and Comparative Examples. The test piece was bonded onto a glass plate with a pressure-sensitive adhesive, and the resultant was heated by being left to stand in an oven at 100° C. for 120 hours. The crack generation status of the polarizing film after the heating was examined by visual observation. Evaluation criteria for a crack (durability) are as described below.

∘: No crack (visually recognizable crack having a size of 1 mm or more) is present in the polarizing film.

x: A crack is found at one or more sites in the polarizing film.

4. Decolorization at Time of Humidification

A test piece having opposing two sides in each of a direction perpendicular to the stretching direction and the stretching direction (50 mm×50 mm) was cut out of each of the polarizing films obtained in Examples and Comparative Examples. The test piece was bonded onto a glass plate with a pressure-sensitive adhesive, and the resultant was humidified by being left to stand in an oven having a temperature of 60° C. and a humidity of 95% for 120 hours. The polarizing film after the humidification was arranged in a state of crossed Nicols with a standard polarizing plate, and in this state, was examined for its decolorization status at an end portion with a microscope. Specifically, the size of a decolorized region from an end portion of the polarizing film (decolorization amount: μm) was measured. MX61L manufactured by Olympus Corporation was used as the microscope, and the decolorization amount was measured on the basis of an image taken at a magnification of 10. As shown in FIG. 1, the larger of a decolorization amount a from an end portion in the stretching direction and a decolorization amount b from an end portion in the direction perpendicular to the stretching direction was defined as the decolorization amount. It should be noted that a decolorized region has a markedly low polarizing characteristic and does not substantially function as a polarizing plate, and hence the decolorization amount is preferably 300 μm or less, more preferably 200 μm or less, still more preferably 100 μm or less. Therefore, an evaluation was made by marking a case where the decolorization amount was 300 μm or less with Symbol "∘" (meaning good), and marking a case where the decolorization amount was more than 300 μm with Symbol "x" (meaning poor).

Example 1

An amorphous polyethylene terephthalate film having a long shape and having a water absorption rate of 0.60%, a Tg of 80° C., a modulus of elasticity of 2.5 GPa, and having thickness of 100 μm was used as a resin substrate.

One surface of the resin substrate was subjected to corona treatment (treatment condition: 55 W·min/m$^2$), and an aqueous solution containing 90 parts by weight of polyvinyl alcohol (polymerization degree: 4,200, saponification degree: 99.2 mol %) and 10 parts by weight of acetoacetyl-modified PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z200") was applied onto the corona-treated surface and dried at 60° C. to form a PVA-based resin layer having a thickness of 11 μm. Thus, a laminate was produced.

The resultant laminate was subjected to free-end uniaxial stretching in its longitudinal direction (lengthwise direction) at a ratio of 1.8 times in an oven at 120° C. between rolls having different peripheral speeds (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (an aqueous solution of iodine obtained by compounding 100 parts by weight of water with 0.2 part by weight of iodine and 3.0 parts by weight of potassium iodide) for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, while the laminate was immersed in an aqueous solution of boric acid having a liquid temperature of 70° C. (boric acid concentration: 5.0 wt %), the laminate was subjected to uniaxial stretching (underwater stretching) in its longitudinal direction (lengthwise direction) between rolls having different peripheral speeds so that the total stretching ratio was 5.5 times.

After that, the laminate was immersed in a washing bath having a liquid temperature of 30° C. (an aqueous solution obtained by compounding 100 parts by weight of water with 4 parts by weight of potassium iodide (washing treatment).

Thus, a polarizing film having a thickness of 5 μm was formed on the resin substrate.

Subsequently, an aqueous solution of a PVA-based resin (manufactured by The Nippon Synthetic Chemical Industry Co., Ltd., trade name: "GOHSEFIMER™ Z-200", resin concentration: 3 wt %) was applied onto the PVA-based resin layer surface of the laminate, and a cycloolefin-based film (manufactured by ZEON CORPORATION, Zeonor ZB12, thickness: 50 μm) was bonded thereonto. The resultant was heated in an oven kept at 60° C. for 5 minutes to produce an optically functional film laminate including a polarizing film having a thickness of 5 μm. The single axis transmittance of the polarizing film was measured by a conventional method and was found to be 44.0%. After that, the resin substrate was peeled off to obtain a polarizing plate having a construction in which a protective film is arranged on one surface of the polarizing film.

The iodine concentration and boric acid concentration of the obtained polarizing film were determined as described above, and the cross-linking index was calculated on the basis of the iodine concentration and the boric acid concentration. Further, a pressure-sensitive adhesive and glass were laminated on the surface (surface opposite to the protective film) of the obtained polarizing film, and the resultant was subjected to the evaluations for a crack and decolorization at the time of humidification. Table 1 shows the results.

Example 2

An optically functional film laminate including a polarizing film having a thickness of 5 μm was obtained in the same manner as in Example 1 except that: the boric acid concentration of the aqueous solution of boric acid in the underwater stretching was changed to 6.5 wt %; and an aqueous solution of iodine obtained by compounding 100 parts by weight of water with 0.15 part by weight of iodine and 1.0 part by weight of potassium iodide was used as the dyeing bath. The polarizing film had a single axis transmittance of 45.0%. The obtained polarizing film was subjected to the same evaluations as those of Example 1. Table 1 shows the results.

Comparative Example 1

An optically functional film laminate including a polarizing film having a thickness of 5 μm was obtained in the same manner as in Example 1 except that the boric acid concentration of the aqueous solution of boric acid in the underwater stretching was changed to 4.0 wt %. The polarizing film had a single axis transmittance of 44.0%. The obtained polarizing film was subjected to the same evaluations as those of Example 1. Table 1 shows the results.

Comparative Example 2

An optically functional film laminate including a polarizing film having a thickness of 5 μm was obtained in the same manner as in Example 1 except that: the boric acid concentration of the aqueous solution of boric acid in the underwater stretching was changed to 4.0 wt %; and an aqueous solution of iodine obtained by compounding 100 parts by weight of water with 0.15 part by weight of iodine and 1.0 part by weight of potassium iodide was used as the dyeing bath. The polarizing film had a single axis transmittance of 45.0%. The obtained polarizing film was subjected to the same evaluations as those of Example 1. Table 1 shows the results.

Reference Example 1

While a PVA-based resin film (manufactured by KURARAY CO., LTD., trade name: "PS-7500", thickness: 75 μm, average polymerization degree: 2,400, saponification degree: 99.9 mol %) was immersed in a water bath at 30° C. for 1 minute, the PVA-based resin film was stretched in its feeding direction at a ratio of 1.2 times. After that, while the PVA-based resin film was dyed by being immersed in an aqueous solution at 30° C. having an iodine concentration of 0.04 wt % and a potassium concentration of 0.3 wt %, the PVA-based resin film was stretched at a ratio of 2 times with reference to an unstretched film (original length). Next, while the stretched film was immersed in an aqueous solution at 30° C. having a boric acid concentration of 4 wt % and a potassium iodide concentration of 5 wt %, the stretched film was further stretched to a ratio of 3 times with reference to the original length. Subsequently, while the stretched film was immersed in an aqueous solution at 60° C. having a boric acid concentration of 4 wt % and a potassium iodide concentration of 5 wt %, the stretched film was further stretched to a ratio of 6 times with reference to the original length, followed by drying at 70° C. for 2 minutes, to thereby obtain a polarizer having a thickness of 27 μm. The polarizer had a single axis transmittance of 41.0%. The obtained polarizer was measured for its iodine concentration and boric acid concentration in the same manner as in Example 1. Subsequently, an aqueous solution of a PVA-based resin (manufactured by The Nippon Synthetic Chemical Industry Co., Ltd., trade name: "GOHSEFIMER™ Z-200", resin concentration: 3 wt) was applied onto each of both surfaces of the polarizer, and a cycloolefin-based film (manufactured by ZEON CORPORATION, Zeonor ZB12, thickness: 50 μm) was bonded onto each of both surfaces. The resultant was heated in an oven kept at 60° C. for 5 minutes to obtain a polarizing plate. The obtained polarizing plate was subjected to the same evaluations as those of Example 1. Table 1 shows the results.

Reference Example 2

A polarizer having a thickness of 27 μm was obtained in the same manner as in Reference Example 1 except that the iodine concentration and potassium concentration of the dyeing bath were changed to 0.03 wt % and 0.2 wt %, respectively. The polarizer had a single axis transmittance of 42.0%. The obtained polarizer was subjected to the same evaluations as those of Example 1. Table 1 shows the results.

Reference Example 3

A polarizer having a thickness of 27 μm was obtained in the same manner as in Reference Example 1 except that the iodine concentration and potassium concentration of the dyeing bath were changed to 0.025 wt % and 0.18 wt %, respectively. The polarizer had a single axis transmittance of 43.0%. The obtained polarizer was subjected to the same evaluations as those of Example 1. Table 1 shows the results.

TABLE 1

|  | Single axis transmittance (%) | Boric acid concentration of stretching bath | Iodine concentration of polarizing film | Boric acid concentration of polarizing film | Cross-linking index | Crack | Decolorization by humidification | Decolorization amount (μm) |
|---|---|---|---|---|---|---|---|---|
| Example 1 | 44.0 | 5.0 | 5.4 | 19.0 | 103 | ○ | ○ | 200 |
| Example 2 | 45.0 | 6.5 | 5.0 | 20.0 | 100 | ○ | ○ | 200 |
| Comparative Example 1 | 44.0 | 4.0 | 5.4 | 12.0 | 65 | ○ | x | 500 |
| Comparative Example 2 | 45.0 | 4.0 | 5.0 | 10.0 | 50 | — | — | — |
| Reference Example 1 | 41.0 | 4.0 | 2.7 | 23.0 | 62 | ○ | ○ | 100 |
| Reference Example 2 | 42.0 | 4.0 | 2.5 | 22.0 | 55 | ○ | ○ | 100 |
| Reference Example 3 | 43.0 | 4.0 | 2.3 | 22.0 | 51 | ○ | ○ | 100 |

The unit of concentration is wt % in all cases.
"—" means that measurement could not be performed owing to breakage.

As is apparent from Table 1, in each of the polarizing films of Comparative Examples having a cross-linking index that deviates from the range of the present invention, particularly when the cross-linking index is low, decolorization at the time of humidification is remarkable, indicating insufficient water resistance. Further, as is apparent from a comparison between Examples and Reference Examples, the thin polarizing films of Examples have much higher iodine concentrations at the same single axis transmittances, and show a much larger change in iodine concentration in accordance with a change in single axis transmittance. Further, as is apparent from Reference Examples, the problem of durability does not occur in the conventional thick polarizers even when the cross-linking index is small, and such problem is a problem peculiar to thin polarizing films.

The optically functional film laminate (typically, polarizing plate) including the polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens. The optically functional film laminate including the polarizing film of the present invention is also suitably used as an antireflection film for an organic EL panel.

According to one embodiment of the present invention, the polarizing film that is excellent in optical characteristics, and is excellent in durability and water resistance can be obtained through the optimization of the cross-linking index in a thin polarizing film having a low iodine content.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polarizing film, comprising a polyvinyl alcohol-based resin film having a thickness of 7 μm or less, wherein:
   the polyvinyl alcohol-based resin film has an iodine concentration of 4.0 wt % to 6.0 wt %;
   the polyvinyl alcohol-based resin film has a boric acid concentration of 17 wt % to 30 wt %; and
   the polarizing film has a cross-linking index defined by the below-indicated equation of from 100 to 180:

(Cross-linking index) [(wt %)$^2$]=(Iodine concentration in film) [wt %]×(Boric acid concentration in film) [wt %].

2. A method for manufacturing the polarizing film according to claim 1, comprising:
   forming a polyvinyl alcohol-based resin layer on one side of a resin substrate; and
   stretching and dyeing a laminate of the resin substrate and the polyvinyl alcohol-based resin layer to form the polyvinyl alcohol-based resin layer into a polarizing film,
   the stretching comprising stretching the laminate while immersing the laminate in an aqueous solution of boric acid, the aqueous solution of boric acid having a boric acid concentration of 5.0 wt % or more.

3. A method according to claim 2, wherein the aqueous solution of boric acid has a temperature of 60° C. or more.

* * * * *